Dec. 8, 1959   J. W. CROWNOVER   2,916,578
ELECTROSTRICTIVE CAPACITIVE RELAY HAVING
TENSION MOUNTED ACTUATOR
Filed April 1, 1955   2 Sheets-Sheet 1
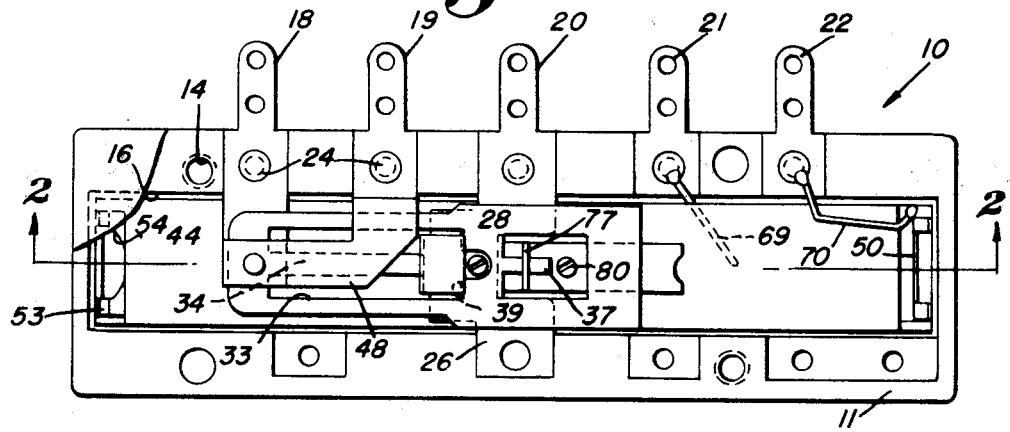
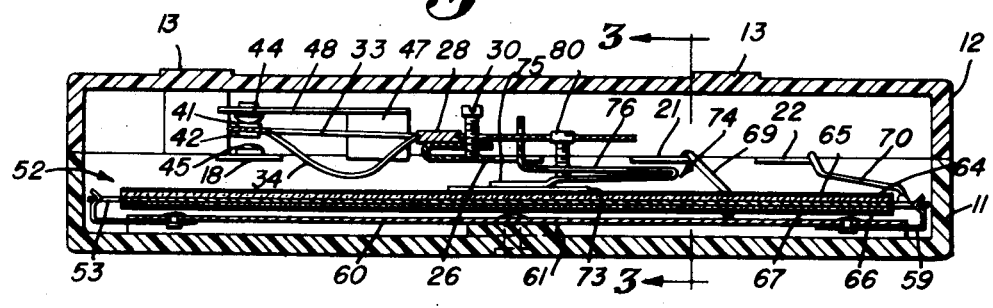
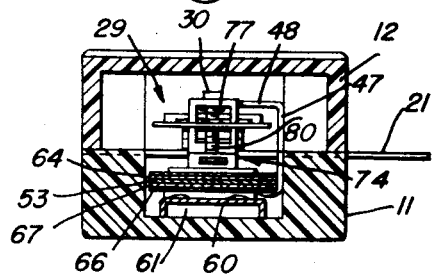
JOSEPH W. CROWNOVER
INVENTOR.
BY 
Attorney

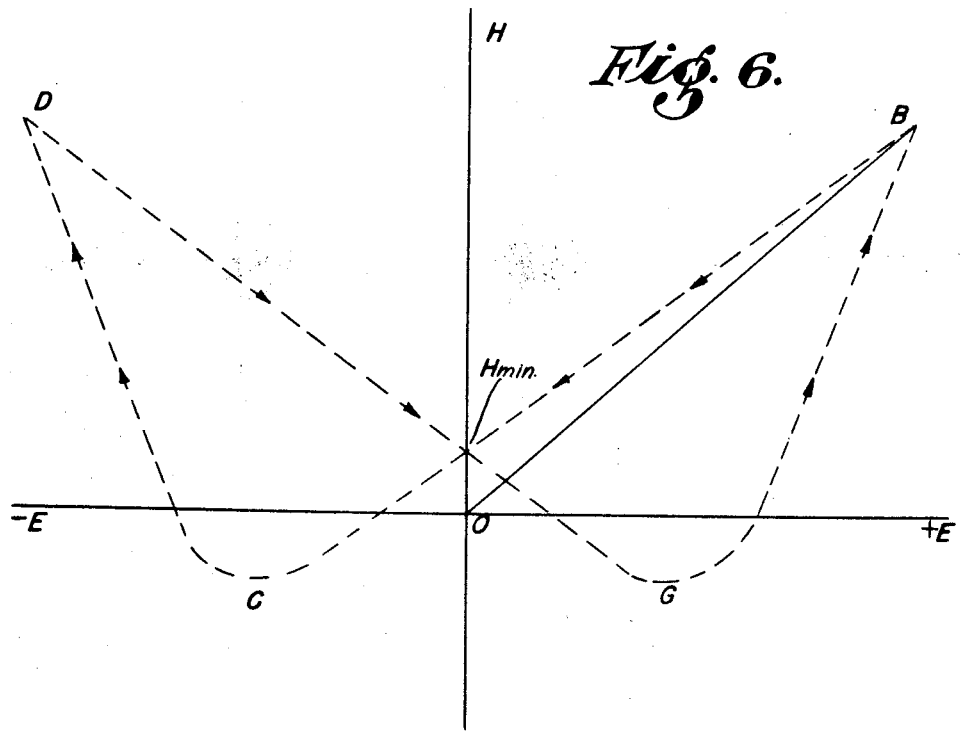
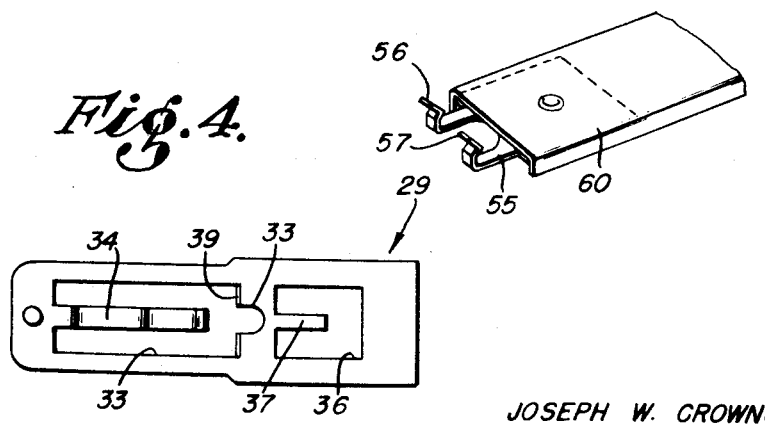
JOSEPH W. CROWNOVER
INVENTOR.
BY
Attorney

United States Patent Office 2,916,578
Patented Dec. 8, 1959

2,916,578

ELECTROSTRICTIVE CAPACITIVE RELAY HAVING TENSION MOUNTED ACTUATOR

Joseph W. Crownover, Sherman Oaks, Calif., assignor to Electric Machinery Mfg. Company, Minneapolis, Minn., a corporation of Minnesota Application April 1, 1955, Serial No. 498,703

9 Claims. (Cl. 200—87)

This invention relates to electrostrictive ceramic actuator elements which are particularly adapted for use in various types of relays, and to the mounting of the activator element. The sizable electrostrictive properties of high dielectric ceramic materials such as barium titanate have made possible their practical use in electrical voltage responsive non-magnetic relays. This invention is concerned with the utilization of the electrostrictive properties of these high dielectric materials, and particularly it is concerned with the utilization in relays of more particular ceramic materials in which the electrostrictive property has been enhanced and the piezoelectric property has been rendered insignificant or negligible, as will be explained in more detail below. In particular, the invention is concerned with ceramic materials and their utilization in relays when the material is such that it retains negligible or insignificant polarization charge. The significance of this is that if polarization of the ceramic may be increased and retained, it may also be decreased with the result that the ceramic as an actuator is unstable and is not practical for use in relays.

Electrostriction, in the broadest sense of dielectrics, pertains to an inter-relationship between an electric field and the deformation of the dielectric in that field. Although this includes the piezoelectric phenomenon, most authorities, in order to avoid confusion, reserve the term "electrostrictive" for the effect that the deformation of the dielectric material subjected to an electro-static field is proportional to the square of the impressed electric field thereby being independent of the applied fields' polarity. The distinction is explained in the volume by Cady, Piezo-electricity (McGraw-Hill Book Company, 1946). Where the polarization charge is not being depended on for the deforming and actuating effect, the device is not subject to any instability due to lack of control of the remaining polarization charge.

The early dielectrics possessed practically no electrostrictive properties. However, as developments have progressed, dielectrics have been produced with dielectric constants of 100, 1,000, and as high as 10,000, compared to air. The development of these high dielectric materials, particularly ceramic materials, has made possible the design of electrostrictive capacitive relays not in any way dependent on magnetic principles. The utilization of improved ceramic materials, particularly the improved materials in which the electrostrictive effect has been greatly enhanced and the tendency of the material to retain polarization charges reduced to a minimum, has made possible successful relays using electrostrictive capacitive elements as the actuator thereof. These materials are particularly adaptable for use in relays in which the actuating element appears as a capacitor element and is operative in response to a single voltage pulse of either polarity. Various forms of barium titanate ceramics with high dielectric constants provide a very large dimensional change when subjected to electrostatic fields, and this dimensional change results from the electrostrictive properties of the material, and this is particularly true in the special ceramic materials described herein. These particular materials are materials such as barium titanate including an additive as an impurity which shifts the Curie point to a point near room temperature, say 70° F. The material is operated or worked near this temperature. Any remanent polarization charge is negligible.

As pointed out, when these materials are utilized in a relay, the actual element is in the form of a capacitor having very high leakage resistance. The unit operates in response to a voltage pulse and the power requirements are negligible or insignificant. The relay, utilizing the ceramic materials may be operated with moderate potential supplies over extremely high impedance circuits which impedance may be in the order of megohms. The relay is adapted to many and varied applications, as, for example, it is ideally adapted for use in remote control applications where the control lines may be long high resistance circuits.

This invention and the application is a continuation in part of my earlier filed application Serial No. 452,985, filed August 30, 1954, now abandoned. The invention is concerned, among other things, with certain improvements in mounting of the electrostrictive unit whereby gains in stability of the relay are achieved which increase its performance and enlarge on its range of application. The invention involves other improvements in electrostrictive capacitive relays, as will appear hereinafter. The stability of the relay has particular reference to its ability to retain its calibration, that is, that it will continue to operate at the same predetermined established operating voltages. Relays have been known to the prior art, using crystals exhibiting a piezoelectric effect or phenomena, as will be referred to hereinafter, but they have generally been subject to a serious deficiency among other things, in that the element would manifest a sag or permanent deformation after use, which would destroy its stability. While as explained in the foregoing, the relay of this invention is not dependent upon piezoelectric polarization charge, it has been found that improvements in performance of the electrostrictive unit can be had by reason of the particular mounting of the unit of this invention. In regard to the mounting of the electrostrictive unit, the particular feature resides in the mounting of the unit in such a way as to maintain it under tension. The unit may be one which in a relay, for example, deforms by bowing. By providing the tension mounting, a force is provided to return the device to normal when de-energized, and a tendency towards a permanent sag or permanent deformation is eliminated. The device thus retains its stability, that is, its ability to operate consistently at the same predetermined established voltages regardless of ambient temperature etc. The invention, therefore, offers considerable advantages over other types of mountings such as compression mountings or cantilever types. For example, in cantilever types a substantial portion of the beam must be used to establish a solid mounting, and small measures of compliance of the mount cause large losses of displacement at the driving end of the cantilever.

The invention provides further improvements involving a snap action mechanism for actuating electrical contacts, which is particularly adapted to the relatively small energies generated by deformable electrostrictive units and adapted for mounting in relatively small and compact housings with the actuator unit. The snap action mechanism serves to relieve the electrostrictive unit or element of stresses in its operative positions and provides positive charged and discharged positions of the capacitive element. The snap action mechanism is a novel type utilizing a snap spring having an integral compression element which serves to provide a firm and positive knife-edge pivotal mounting of the snap spring such that the device is sufficiently rugged and able to withstand vibration, shocks, jars, etc.

In accordance with the foregoing, it is an object of the invention to provide an electrostrictive actuator unit for use in relays and the like, the unit comprising ceramic materials such as forms of barium titanate, the actuator unit being mounted so as to normally be under tension.

Another object of the invention is to provide a tension mounted electrostrictive actuator unit as in the foregoing wherein the actuator unit is a ceramic having the properties that it retains only a negligible polarization charge as a result of the application of voltage to the element for actuation, the ceramic having a relatively low Curie point near room temperature.

Another object of the invention is to provide a tension mounted electrostrictive actuator unit as in the foregoing wherein the actuator unit is a ceramic composition including barium titanate and modifying additives whereby the remanent polarization charge of the material is minimized.

Another object of the invention is to provide electrostrictive actuator units as in the foregoing, wherein the units are in the form of elongated ceramic strips mounted by way of spring clips engaging the ends of the strips and exerting outward force thereon.

Another object of the invention is to provide an electrostrictive relay having a tension mounted electrostrictive capacitive element having a snap action device of the type utilizing a snap spring actuatable by the electrostrictive capacitive element.

Another object of the invention is to provide a snap action device adapted to be operated by a deformable electrostrictive capacitive actuator comprising a knife-edge mounted snap spring having a single integral compressive element, one end of which has a knife-edge engagement with a fixed support, the compressive force in the element providing a firm engagement of the snap spring with the support.

Another object of the invention is to provide an improved snap spring comprising a longitudinally slotted strip of spring material having an intermediate integral strip forming a compression element adapted to have one end thereof engaging an intermediate fixed support so that the compressive element urges the snap spring into engagement with the support.

Another object of the invention is to provide a snap spring, as in the foregoing object, the snap spring having an opening having a projecting portion extending into the opening with the operating member for the snap spring extending through the opening and engaging the projection.

Further objects and numerous advantages and applications of the invention will become apparent from the following detailed description and annexed drawings, wherein:

Fig. 1 is a plan view of a preferred form of the invention with the cover of the housing thereof removed;

Fig. 2 is a sectional view of the invention taken along line 2—2 of Figure 1;

Fig. 3 is a sectional view taken along line 3—3 of Figure 2;

Fig. 4 is a detail view of the snap spring of the invention;

Fig. 5 is a detail perspective view of the tension mounting at one end of the actuator; and Fig. 6 is a graph illustrating the quadratic deformation of the electrostrictive ceramic material in response to the application of an electrostatic field.

The invention is described hereinafter with reference to a relay in which the electrostrictive ceramic element is tension mounted. It will be understood that the ceramics as utilized in the exemplary relay are those discussed hereinafter. The disclosure hereinafter as applied to a relay is representative of other applications that can be made of the tension mounted ceramics as disclosed.

One of the ceramic materials which has a high dielectric constant and which exhibits a significant electrostrictive effect comprises a polycrystalline agregate such as a titanate ceramic. A titanate ceramic having suitable transducing qualities is an aggregate comprising crystals of barium titanate and additives of strontium titanate bonded together with binder in a manner known in the art. The additives constitute an impurity. When subjected to electrostatic fields, this material is capable of developing mechanical strain by virtue of its inherent electrostrictive properties. A transducer element of this material responds to an applied electrostatic field by expanding in the direction of the field and contracting in a plane transverse to the direction of the field.

As has been explained in the foregoing, ceramic materials having higher and higher dielectric constants have been developed and by this invention the inherent electrostrictive properties of these materials have been utilized. This invention utilizes material in which the electrostrictive property is more thoroughly pronounced and the tendencies of the materials to retain polarization charge is rendered insignificant or negligible. The development of the presently highly successful electrostrictive ceramics has continued over a period in which increasing success has been achieved by the combining with relatively pure barium certain small additives, to minimize the remanent polarization. The effect of the additives is to shift the Curie point to a relatively low value at or near room temperature, the material remaining electrostrictive. Thus at the normal operating temperatures any remanent polarization charge is negligible. (Prior art piezoelectric materials are known to lose their polarization charge when heated above the Curie point.) At the outset, it may be stated that the objective has been to isolate and enhance the electrostrictive property of the materials and has sought to render the remaining polarization charge effect negligible. That is, to explain the meaning of this, it means that the objective has been to cause the ceramic materials to have such character that when subjected to voltages for purposes of actuation, the material would not retain any significant polarization. As a result of the process of development, as pointed out, successful electrostrictive ceramic materials were developed and successful compositions of these are indicated in the following examples:

*Composition 1*

| | Percent |
|---|---|
| $BaTiO_3$, 610 grams | 61 |
| $SrTiO_3$, 390 grams | 39 |
| Resinous or plastic binder. | |

*Composition 2*

| | Parts |
|---|---|
| $BaTiO_3$ | 500 |
| $CaSnO_3$ | 15 |
| Resinous or plastic binder. | |

In the foregoing examples, the materials other than the barium titanate, the strontium titanate and calcium stannate ceramics are materials constituting a resin or binder utilized to bind together the comminuted ceramics. The preparation of the ceramics having the foregoing compositions may be in accordance with prior teachings or it may be in accordance with the process of my earlier application, Serial No. 425,664, filed April 26, 1954. In general, the ceramics are formed in very thin sheets of uniform thickness with the ceramic particles dispersed through a body of polymerized thermoplastic resin, the ware being adapted to be baked at elevated temperatures to produce high quality ceramic sheets. The material is originally in the form of a relatively thick viscous liquor mixture from which the resins are baked out in the process. The resins may be melamine-formaldehyde resins for example.

As an example of the experimental preparation of one of the compositions listed above, the resin was weighed out in a beaker and its solvent which may be a low molecular weight alcohol then weighed in the same beaker. The combination was then placed on a hot plate and solution occurred neatly and quickly with no complications. The comminuted ceramics were next added and the material was formed into a thin sheet and baked to burn out the resins leaving a sintered ceramic sheet.

The ceramic materials having compositions as in the foregoing are formed into thin sheets and for purposes of relay applications the sheets may be cut into strips of suitable widths and lengths to be used as actuators. To illustrate the electrostrictive effect, if such a strip has an electrode applied to its opposite faces, as will be described, the application of voltage between the electrodes will result in an expansion of the material in the direction between the electrodes and a constriction or contraction in the other dimensions. The effect is quadratic, as indicated in the graph Fig. 6 of the drawings. Referring to Fig. 6, this figure shows a plot of the thickness dimensional changes of a strip of ceramic as produced in the foregoing as a function of applied potential. It will be understood that this graph has reference to a ceramic produced as in the foregoing which is uncharged, that is, which possesses and/or retains only a negligible remanent polarization charge. The ordinates of the curve of this graph are H, the thickness displacement of the beam or strip of ceramic and the abcissas are E the applied voltages. The resulting electrostatic field is directly proportional to E. Initially, H is zero at zero field. With the subsequent application of a small electric field, the curve of Fig. 6 is traced from zero to B as shown by the solid line. Upon removal of the field, the displacement does not return to zero but the strip retains a small remanent displacement H min.

A reversal of E will cause the displacement to go to zero and with a higher reverse potential slightly farther to maximum negative position C. Then with increasing negative values of E, the displacement will move to D in Fig. 6. Removal of the field will cause the displacement H to again increase to H min. Upon further applications and reversals of E, the current will trace from B to C to D to G and back to B, thus forming a complete cycle.

The curve is substantially quadratic in effect. It is, therefore, by the previously stated definition of electrostriction, representative of the actual electrostrictive phenomenon.

Referring to Fig. 1 of the drawings, numeral 10 designates the invention shown in the form of a relay disposed in a housing formed of two separable parts, the lower of which is shown at 11. The housing may be formed of a phenolic plastic, for example. The housing has an upper half or cover 12, as shown in Fig. 2, and the two parts may be attached by screws extending through openings as provided at 13 and 14. The housing part 11 has an elongated channel 16 therein, as shown, in which the electrostrictive capacitive unit is mounted, as will be described presently. The housing part 11 has a group of contact brackets or terminals carried thereby, as designated at 18, 19, 20, 21 and 22. These contact strips or terminals are mounted in depressions or channels in the upper surface of one side of the housing part 11 so as to be flush therewith, and are attached by being staked thereto, as shown for example at 24. The contact terminals or strips 21 and 22 provide for electrical connections to the electrodes on opposite sides of the active electrostrictive capacitive element, as will be described. The terminal 20 is part of a strip 26 which extends across the housing 11 and which provides support and mounting for the snap spring of the snap action device, as will be described. The strip 26 has an offset and reversely bent portion 27 as may be seen in Fig. 2, and attached to this reversely bent portion by soldering or brazing is a small block member 28 having notches or grooves on its opposite sides, formed to receive knife-edge portions of the snap spring 29, as will be described. Numeral 30 designates an adjusting screw which extends through an opening 33 in the snap spring 29 and which extends through the reversely bent portion 27 of strip 26, and also through strip 26 itself. By adjusting screw 30 the reversely bent portion 27 can be compressed downwardly to thereby adjust the mounting position of block 28 of the snap spring 29.

The snap spring is shown in detail in Fig. 4, having the shape as shown therein. As may be seen, it is longitudinally slotted to form an opening as shown at 33, which provides an integral intermediate strip 34 which terminates at an intermediate point as shown, spaced from the opening 33. The strip 29 also has an opening as shown at 36, which is rectilinear, and which has a narrow projection 37 extending thereinto, that is, in an outward direction from the intermediate part of the strip. In the mounted position of the strip 29, as will be observed in Fig. 2, the inner end of the element or reach 34 engages in a groove in the left side of block 28, and the shoulders 39 adjacent opening 33 engage in a groove on the right side of block 28. It will be seen, therefore, that the strip or reach 34 is bowed, that is, it is under compression, and that it urges strip 29 to the right so that the strip engages firmly with the block 28. At the left end of the strip 29 it carries electrical contacts 41 and 42 which cooperate respectively with fixed electrical contacts 44 and 45. The contact terminal or strip 18 extends inwardly as shown, and it carries the fixed electrical contact 45. The contact strip or terminal 19 has an upwardly offset portion 47, and a laterally offset portion 48 which carries the fixed contact 44 as shown.

The precise operation of the snap acting contacts will be described presently, it being observed that the snap action mechanism is suitably mounted in a compact manner over the electrostrictive capacitive actuator which is within the longitudinal channel 16 of housing part 11 as previously described.

Referring now more particularly to Fig. 2, the electrostrictive actuator unit is designated generally at 52. In the form shown, it includes an intermediate metal electrode member 53 which is mounted so as to be under tension in the manner previously referred to. The electrode member 53 has openings at its ends, as shown at 54. The tension mounting is provided by spring clips which engage in the openings. For example, as shown in Fig. 5, numeral 55 designates a resilient bifurcated element having spring clips or fingers, as shown at 56 and 57, which are bent as shown, and which extend upwardly through the opening 54, and engage the transverse portion at the end of the member 53. A similar bracket 59 is provided at the other end of strip 53, and these brackets are attached by riveting or the like, to the ends of a mounting bar 60. The intermediate part of the mounting bar 60 is attached by riveting or the like, to a boss 61 upstanding from the bottom of the housing part 11 as shown in Fig. 2. It will be observed that with the bar 60 mounted intermediately as shown, the mounting of the electrostrictive unit is not affected by warping, twisting, or other deformation of the casing 10 as a whole. The actuator 52 includes an electrostrictive ceramic element of the type referred to in the foregoing, as shown at 64, bonded to its upper surface. The upper surface of element 64 has an electrode formed thereon, as shown at 65, which may be by way of applying silver paint thereto for example. A similar ceramic unit 66 is bonded to the lower side of element 53 and may have a similar electrode 67 formed thereon. The materials of the elements 64 and 66 are ceramics which exhibit a pronounced electrostrictive effect, as previously described, having insignificant retained or remanent polarization charge. The preferred ceramics comprise polycrystalline aggregates of barium titanate and strontium titanate as has been described in the foregoing. In a preferred form of the invention only the element 64 is active, the e'ectrode 65 being connected to contact strip 29 by lead 69, and the intermediate electrode 53 being connected to contact strip 22 by lead 70. The members 64, 66 and 53 are formed of materials having substantially the same coefficient of thermal expansion, such that the unit 52 is unresponsive to temperature; that is, it will not deform or warp in response to temperature changes.

In the operation of the unit 52 when a suitable voltage is connected across the strips 21 and 22, an electrostatic field is applied across the thickness of element 64. The element exhibits an electrostrictive effect, that is, it expands in thickness and contracts longitudinally, as has been explained.

By virtue of the longitudinal contraction, and that the element is bonded to the electrode strip 53, a warping effect results which is a bowing of the entire unit against the outward tension force of the brackets 55 and 59. The intermediate part of the unit 52 therefore moves vertically and operates the snap action mechanism, as will be described.

Carried on the unit 52 at an intermediate part thereof is a mounting pad 73, and attached thereto is a lost motion operating arm or bracket 74. The arm 74 has a portion 75 attached to mounting pad 73 and a reversely bent portion 76, having an upwardly offset arm or part 77 in which is an opening 78. The projecting part 37 of snap spring 29 extends through the opening 78 so that lost motion connections are formed between these parts. Numeral 80 designates an adjusting screw which extends through the opening 36 in snap spring 29 and engages the reversely bent portion 76 of arm 74 and also the main portion of arm 74. By adjusting screw 80 the portions of arm 74 can be compressed together so that the offset part 77 can be moved closer to the actuator 52 and thus, as can be observed, the lost motion connection between the actuator 52 and the snap mechanism can be adjusted for adjusting the voltages at which the device operates between its two positions.

In the operation of the device, when voltage of either polarity is applied between the contact strips 21 and 22, the electrostrictive capacitive actuator 52 deforms in the manner described, and as shown in Fig. 2 it would bow upwardly, causing the lower part of opening 78 to engage projection 37 of snap spring 29, rotating the snap spring counterclockwise. The compression element or reach 34 occupies a position relative to the support block 28, that when the snap spring 29 thus rotates, the reach 34 moves over center so that the left end of spring 29 moves between its positions with a snap action. Thus, in the operation just described, contacts 41 and 44 would be separated, and contact 42 would be brought into engagement with contact 45 with a snap action.

In reverse operation the voltage is removed between contact strips 21 and 22. There is normally a discharge resistor connected between these strips, and when the operating voltage is disconnected the electrostrictive capacitive unit, that is, the capacitance formed by the element 64 with electrodes on its opposite surfaces, discharges therethrough. It will be observed therefore, that the relay transfers its contacts upon charging of the electrostrictive capacitive unit, and re-transfers its contacts upon discharge thereof. The operation is the same irrespective of the polarity applied between contact strips 21 and 22. The leakage current of the electrostrictive capacitive element is ordinarily negligible so that the power requirements of the unit are insignificant. The invention is significant additionally in that the relay may be operated with moderate potential supplies over extremely high impedance circuits, which impedance may be in the order of megohms. Thus the relay is ideally adapted for use in remote control applications where the control lines may be long high-resistance circuits.

The force developed by the unit may be increased simply by multiplying a number of electrostrictive capacity units. Thus, for example, the element 66 may be connected if desired, so that its output is additive with the other element.

Due to the negligible power required and used, the device involves practically no temperature rise, and since it is capacitive rather than magnetic there is no flux involved which might affect adjacent sensitive magnetic devices. The device is operative in response to an accumulation of energy rather than a rate of flow of energy as in electromagnetic devices.

The snap action mechanism is of a type requiring relatively small energy for actuation, adapting it for use with relatively small actuator units, the developed energy of which is relatively small. As pointed out in the foregoing, when the device is deenergized assuming its normal position, the tendency to straighten out is assisted by the tension mounting such that after continued use, the electrostrictive element does not sag or develop a permanent set, which would destroy the stability of the device. The operating potentials can be set by means of the screw 80, and this calibration maintained over many thousands of operations. Stability of the unit is achieved by the utilization of the electrostrictive properties of the materials and by the tension mounting of the active element.

The foregoing is illustrative of a preferred form of my invention, it being understood that various modifications and alternatives may be adopted by those skilled in the art, all of which are intended to fall within the spirit and scope of the claims appended hereto.

I claim:

1. An eletrostrictive element comprising an elongated ceramic element without significant remanent polarization charge having electrodes on oppositely disposed surfaces thereof, the element possessing the electrostrictive characteristic that upon the application of voltage of one polarity between the electrodes it deforms in one sense and upon the application of reverse polarity it deforms in the same sense, and mounting means for the element comprising members engaging the ends thereof, the mounting means having resiliency and arranged to exert the outward force on the element placing it under tension.

2. The structure of claim 1 wherein the said members are in the form of resilient spring clips.

3. A transducer element comprising an elongated ceramic element without significant remanent polarization charge having electrodes on oppositely disposed surfaces thereof, and means for mounting said element whereby upon the application of voltage between the electrodes a deformation of the element results, said mounting means comprising members engaging the ends of the element and arranged to exert an outward force thereon normally maintaining it under tension.

4. In an electrical transducer, in combination: an elongated electrostrictive ceramic member, said member having means forming electrodes on opposite faces thereof, and a reaction member joined thereto; means for mounting said member to allow deformation thereof, the ceramic member having the electrostrictive property that it deforms in the same sense irrespective of the polarity of the voltage applied between said electrodes, the said mounting means including devices engaging the ends of the ceramic member arranged to exert an outward force thereon whereby it is normally maintained under tension.

5. In an electrical relay, in combination: an actuator comprising an elongated electrostrictive capacitive element, said actuator having mounting means arranged so that it is normally under longitudinal tension and being capable of bowing upon the application of voltage thereto; and means comprising a snap action device responsive to physical displacement of an intermediate portion of the actuator.

6. In an electrical relay, in combination: an actuator comprising an elongated electrostrictive capacitive element, said actuator having mounting means arranged so that it is normally under longitudinal tension and being capable of bowing upon the application of voltage thereto; means comprising a snap action device responsive to physical displacement of an intermediate portion of the actuator, said device comprising a snap spring having an over-center snap movement; and means providing connections between said actuator and an intermediate part of said spring.

7. In an electrical relay, in combination: an actuator comprising an elongated electrostrictive capacitive element, said actuator having mounting means arranged so that it is normally under longitudinal tension and being capable of deforming upon the application of voltage thereto; means comprising a snap action device responsive to physical displacement of an intermediate part of the actuator, said snap action device comprising a snap spring having an over-center snap movement lying substantially parallel to the length of the actuator; and means providing connections between the actuator and an intermediate part of the spring.

8. In an electrical relay, in combination: an actuator comprising an elongated electrostrictive capacitive element, said actuator having mounting means arranged so that it is normally under longitudinal tension and being capable of deforming upon the application of voltage thereto; means comprising a snap action device responsive to physical displacement of an intermediate part of the actuator, said snap action device comprising a strip of longitudinally slotted spring material having one integrally resilient reach of length less than that of the strip; a fixed supporting member having a shoulder formed by the end of a slot pivotally engaging therewith, said resilient reach having an end pivotally engaging said supporting member, whereby said reach is under compression whereby the strip is urged into firm engagement with the supporting member, the strip being movable over-center with a snap action by the actuator.

9. The structure of claim 8, including means forming lost motion connections between the actuator and the strip.

References Cited in the file of this patent

UNITED STATES PATENTS

| | | |
|---|---|---|
| Re. 20,213 | Sawyer | Dec. 22, 1936 |
| 1,803,274 | Sawyer | Apr. 28, 1931 |
| 1,967,359 | Hanel | July 24, 1934 |
| 2,033,631 | Gruetzmacher | Mar. 10, 1936 |
| 2,166,498 | Lacey | July 18, 1939 |
| 2,166,763 | Mason | July 18, 1939 |
| 2,177,671 | Schmidinger | Oct. 31, 1939 |
| 2,272,021 | Riche | Feb. 3, 1942 |
| 2,421,586 | Tibbetts | June 3, 1947 |
| 2,486,560 | Gray | Nov. 1, 1949 |
| 2,540,851 | Wiggins | Feb. 6, 1951 |
| 2,706,326 | Mason | Apr. 19, 1955 |
| 2,714,642 | Kinsley | Aug. 2, 1955 |
| 2,800,551 | Crownover | July 23, 1957 |